(12) United States Patent
Liu et al.

(10) Patent No.: US 11,590,850 B2
(45) Date of Patent: Feb. 28, 2023

(54) SYSTEMS AND METHODS WITH DUAL FUNCTION COIL PROVIDING IN-VEHICLE WIRELESS POWER

(71) Applicants: Toyota Motor Engineering & Manufacturing North America, Inc., Plano, TX (US); The Regents of the University of Michigan, Ann Arbor, MI (US)

(72) Inventors: Yanghe Liu, Ann Arbor, MI (US); Qunfang Wu, Westland, MI (US); Mengqi Wang, Troy, MI (US); Weiyang Zhou, Westland, MI (US); Chungchih Chou, Ann Arbor, MI (US)

(73) Assignees: Toyota Motor Engineering & Manufacturing North America, Inc., Plano, TX (US); The Regents of the University of Michigan, Ann Arbor, MI (US)

( * ) Notice: Subject to any disclaimer, the term of this patent is extended or adjusted under 35 U.S.C. 154(b) by 128 days.

(21) Appl. No.: 17/165,463

(22) Filed: Feb. 2, 2021

(65) Prior Publication Data
US 2022/0242255 A1    Aug. 4, 2022

(51) Int. Cl.
*B60L 53/12* (2019.01)
*H02J 50/50* (2016.01)
(Continued)

(52) U.S. Cl.
CPC .............. *B60L 53/12* (2019.02); *B60L 58/18* (2019.02); *H02J 50/10* (2016.02); *H02J 50/502* (2020.01); *H02J 2310/22* (2020.01)

(58) Field of Classification Search
CPC .. B60L 53/12; B60L 58/18; B60L 1/00; B60L 58/20; H02J 50/10; H02J 50/502;
(Continued)

(56) References Cited

U.S. PATENT DOCUMENTS 9,302,591 B2 *   4/2016   Huang .................. B60L 53/122
9,698,608 B2     7/2017   Keeling et al.
(Continued)

FOREIGN PATENT DOCUMENTS

CN    101983466 A *   3/2011   ......... G06K 19/0701
EP       2730451 A1 *   5/2014   ............. B60L 53/39
(Continued)

OTHER PUBLICATIONS

Antaloae et al., "Investigation of High Frequency AC Power Distribution Benefits for the Automobile Auxiliary Electrical System," SAE Int. J. Passeng. Cars—Electron. Electr. Syst. 3(1): 109-121, 2010 (Abstract).

*Primary Examiner* — M Baye Diao
(74) *Attorney, Agent, or Firm* — Christopher G. Darrow; Darrow Mustafa PC

(57) ABSTRACT

A vehicle power system includes a coil that, in a first operational mode, receives power wirelessly from an external source, a first battery connected to the coil to receive power transferred from the coil while the coil is in the first operational mode, a second battery that receives power from the first battery, and a switch that switches the coil between the first operational mode and a second operational mode in which the coil receives power from the second battery and wirelessly transfers power from the second battery to an electrical load in the vehicle.

20 Claims, 7 Drawing Sheets

(51) Int. Cl.
*H02J 50/10* (2016.01)
*B60L 58/18* (2019.01)

(58) Field of Classification Search
CPC .. H02J 2310/22; Y02T 10/70; Y02T 10/7072; Y02T 10/72; Y02T 90/12; Y02T 90/14; Y02T 90/16
USPC .......................................................... 320/108
See application file for complete search history.

(56) References Cited

U.S. PATENT DOCUMENTS

| | | | |
|---|---|---|---|
| 10,044,229 B2 | 8/2018 | Partovi et al. | |
| 10,279,695 B2 | 5/2019 | Jang et al. | |
| 10,305,334 B2 | 5/2019 | Murayama et al. | |
| 10,471,836 B2 | 11/2019 | Yabuuchi | |
| 11,264,843 B1* | 3/2022 | Lim | B60L 53/55 |
| 11,368,051 B2* | 6/2022 | Lee | H02J 50/402 |
| 2007/0075153 A1* | 4/2007 | Blanchard | H02J 50/10 237/12.3 A |
| 2012/0306286 A1 | 12/2012 | Kim et al. | |
| 2013/0026981 A1* | 1/2013 | Van Der Lee | H02J 50/10 320/108 |
| 2013/0169212 A1* | 7/2013 | Sun | H02M 3/33592 320/103 |
| 2014/0257614 A1 | 9/2014 | Niizuma | |
| 2017/0136892 A1 | 5/2017 | Ricci | |
| 2019/0296546 A1* | 9/2019 | Smith | B60R 16/03 |
| 2022/0032790 A1* | 2/2022 | Pfeilschifter | B60L 50/60 |

FOREIGN PATENT DOCUMENTS

| | | | | |
|---|---|---|---|---|
| GB | 2500820 A | * | 10/2013 | B60H 1/2215 |
| KR | 20160055516 A | * | 5/2016 | B60L 53/12 |
| WO | 2017088803 A1 | | 6/2017 | |
| WO | WO-2017203232 A2 | * | 11/2017 | B60L 13/04 |

* cited by examiner

SYSTEMS AND METHODS WITH DUAL FUNCTION COIL PROVIDING IN-VEHICLE WIRELESS POWER

TECHNICAL FIELD

The subject matter described herein relates, generally, to systems and methods for providing in-vehicle wireless power, and more particularly, to systems and methods that use a dual-function coil for receiving power from an external source and for providing power to electronic vehicle components via in-vehicle wireless power transfer.

BACKGROUND

As autonomous vehicles (AVs) and electric vehicles (EVs) become more prevalent, their use cases and capabilities continue to expand. Many newer features that AVs and EVs offer require an increasingly wider range of electronic auxiliary components, including various types of sensors, such as global positioning system (GPS), light detection and ranging (LiDAR), radio detection and ranging (RADAR), global navigation satellite system (GNSS), inertial measurement unit (IMU), cameras, computer processors, and the like. Such added electrical components increase energy consumption required to control the vehicle and also expand the auxiliary load profile of the vehicle. In conventional vehicle power systems that include auxiliary components, more auxiliary power and transmission wires are required to supply energy. Accordingly, the placement and distribution of these additional devices using conventional vehicle power systems is becoming increasingly complex, expensive and sophisticated.

SUMMARY

The disclosed systems and methods relate to a vehicle power system including a dual function coil that can wirelessly receive power from an external source via inductive charging to charge one or more vehicle batteries, and wirelessly transfer power from the one or more vehicle batteries to one or more auxiliary components within the vehicle.

In one embodiment, the disclosed vehicle power system includes a coil that, in a first operational mode, receives power wirelessly from an external source, a first battery connected to the coil to receive power transferred from the coil while the coil is in the first operational mode, a second battery that receives power from the first battery, and a switch that switches the coil between the first operational mode and a second operational mode in which the coil receives power from the second battery and wirelessly transfers power from the second battery to an electrical load in the vehicle.

In one embodiment, a method of controlling a power system for a vehicle includes receiving power, by a coil in a first operational mode, wirelessly from an external source, transferring power from the coil to a first battery while the coil is in the first operational mode, charging a second battery with power from the first battery, and switching the coil from the first operational mode to a second operational mode in which the coil receives power from the second battery and wirelessly transfers power from the second battery to an electrical load in the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with a dual-mode vehicle power system that can provide wireless power transfer are disclosed. Wireless power transfer has significant advantages over conventional wire-based conductive power transfer. Nevertheless, conventional automobile auxiliary power supply systems use 14-V and 42-V DC conductive electrical systems connected to loads by bulky cables, many connectors, and duty plugs. To overcome these limitations, the disclosed dual-mode vehicle power system provides a wireless charging electrical network with an integrated auxiliary power supply that can address the above issues as well as provide advantages of a wireless charging system. The disclosed dual-mode vehicle power system also includes a flexible inductive pad that provides dual functionality (i.e., receiver and transmitter) that can lower system size and cost.

Figure 1:
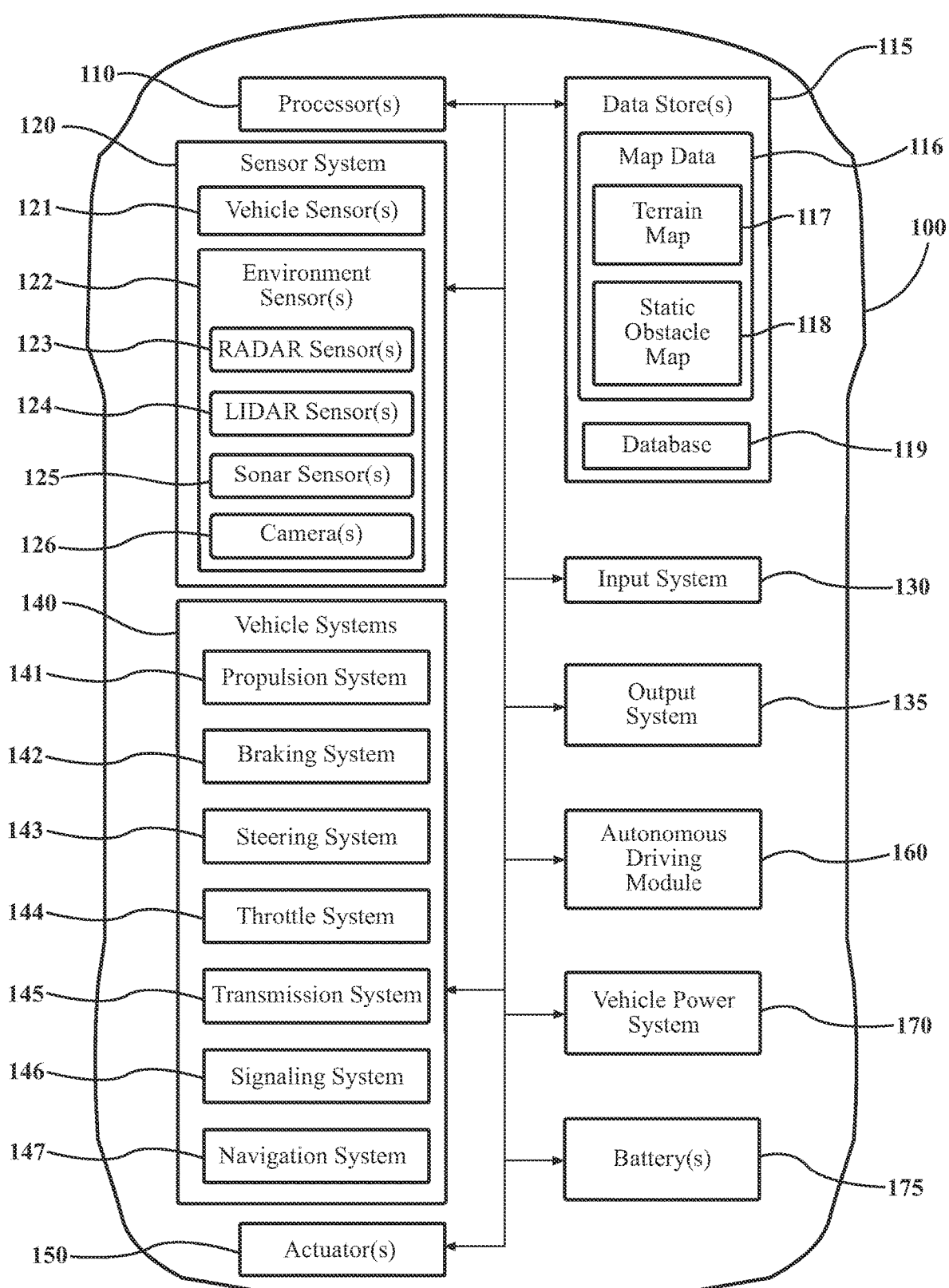
FIG. 1 illustrates one embodiment of a vehicle within which embodiments disclosed herein may be implemented.

Referring to FIG. 1, an example of a vehicle 100 is illustrated. As used herein, a "vehicle" is any form of transport that is used for moving people, animals, goods, or the like. In one or more implementations, the vehicle 100 is an automobile. While arrangements will be described herein generally with respect to automobiles, it should be understood that the scope of the disclosed subject matter is not limited to automobiles. In some implementations, the vehicle 100 may be any form of powered, multi-wheeled transport or vehicle that may include a battery and thus can benefit from the functionality discussed herein.

As shown in FIG. 1, the vehicle 100 includes multiple elements. It should be understood that in various embodiments the vehicle 100 may not necessarily include all of the elements shown in FIG. 1. The vehicle 100 can have any combination of the various elements shown in FIG. 1. Further, the vehicle 100 can have other elements in addition to those shown in FIG. 1. In some arrangements, the vehicle 100 may be implemented without one or more of the elements shown in FIG. 1. While the various elements are shown as being located within the vehicle 100 in FIG. 1, it should be understood that one or more of these elements can be located external to the vehicle 100. Further, the elements shown may be physically separated by large distances.

Some of the possible elements of the vehicle 100 are shown in FIG. 1 and will be described along with subsequent figures. However, a more detailed description of many of the elements in FIG. 1 will be provided after the discussion of FIGS. 2-7 for purposes of brevity in this description. For simplicity and clarity of illustration, where appropriate, reference numerals have been repeated among the different figures to indicate corresponding or analogous elements. In addition, while the discussion outlines numerous specific details to provide a thorough understanding of the embodiments described herein, those of ordinary skill in the art will understand that the embodiments described herein may be practiced using various combinations of these elements.

In any case, the vehicle 100 includes a vehicle power system 170 that is implemented to perform methods and other functions as disclosed herein relating to both charging and distributing power from one or more batteries 175 of the vehicle 100. The noted functions and methods will become more apparent in the following discussion of the figures.

Figure 2:
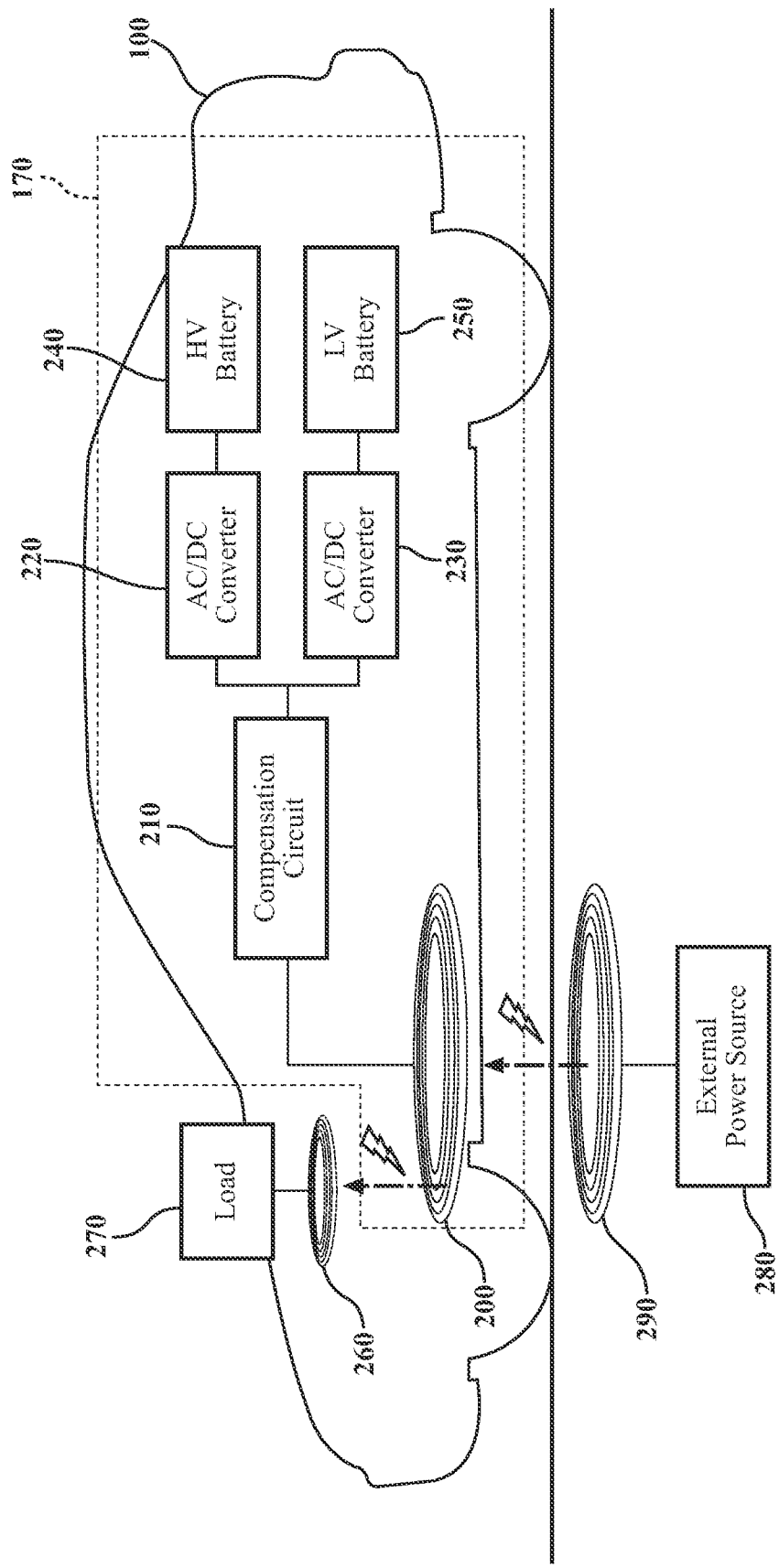
FIG. 2 illustrates one embodiment of a vehicle power system, according to the disclosed subject matter.

With reference to FIG. 2, one embodiment of an implementation of the vehicle power system 170 of FIG. 1 is illustrated. The vehicle power system 170 is shown as including a coil 200, compensation circuit 210, first AC/DC converter 220, second AC/DC converter 230, high voltage (HV) battery 240, and low voltage (LV) battery 250. The coil 200, as indicted above, can operate in multiple modes.

In a first operational mode, the coil 200 can function as a wireless receiver to receive power from an external power source 280 via an external coil 290. The power received from the external power source 280 passes through the compensation circuit 210 and through the first AC/DC converter 220 to charge the HV battery 240, and passes through the second AC/DC converter 230 to charge the LV battery 250.

In a second operational mode, the coil 200 can transfer power stored in the batteries 240, 250 to a load 270 in the vehicle. In this mode the coil 200 functions as a transmitter to wirelessly transfer power to the load 270, which receives the power via a receiver coil 260.

Figure 3:
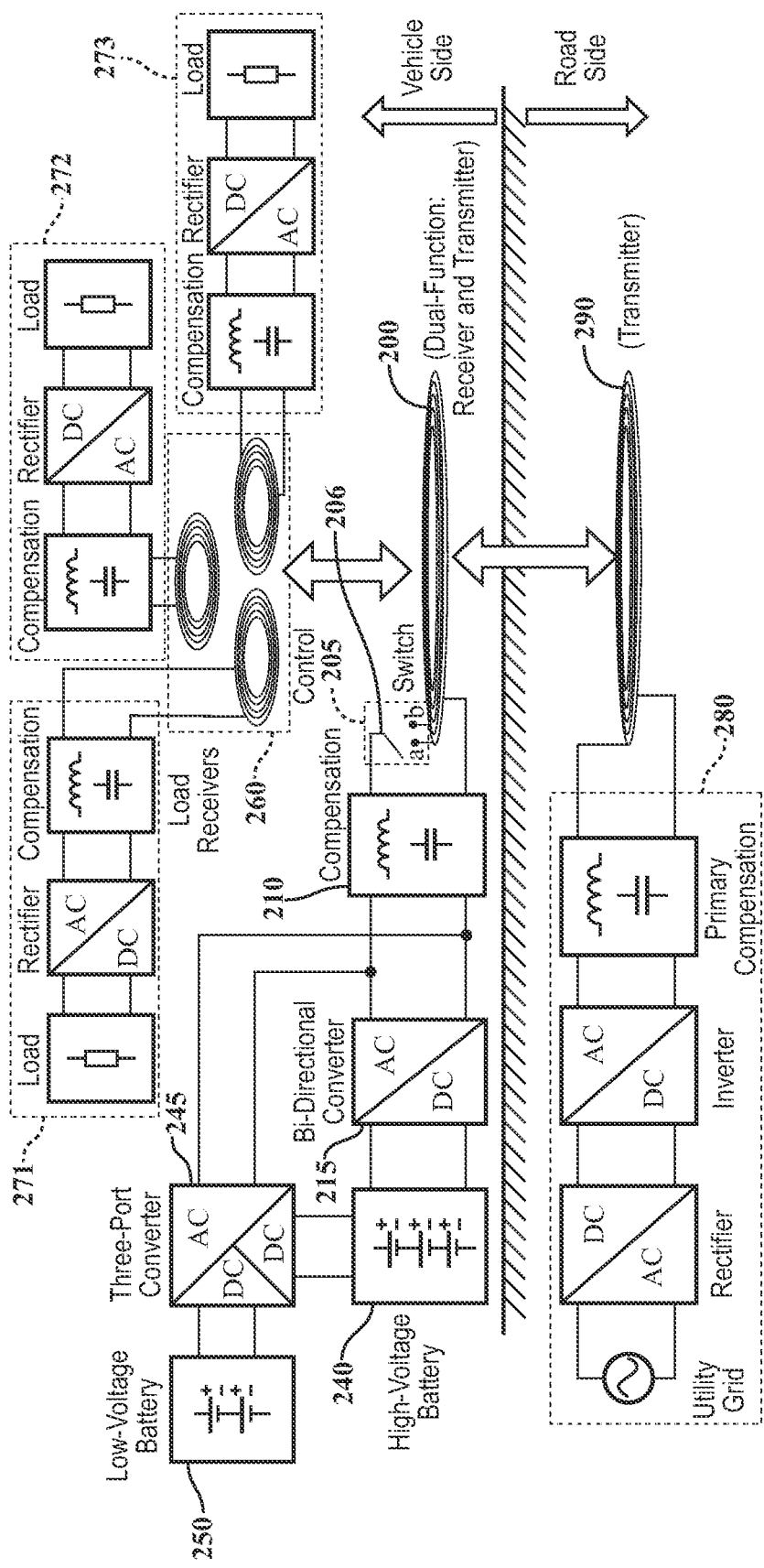
FIG. 3 illustrates example details of the disclosed vehicle power system, according to the disclosed subject matter.

FIG. 3 shows further details of the disclosed vehicle power system 170. In one or more embodiments, the external power source 280 is powered by a utility grid that provides energy through an in-ground coil 290. For example, the coil 290 can be installed in a parking space, a garage, or other location at which the vehicle 100 may receive power.

While the vehicle 100 is near the external power source 280, the external coil 290 can wirelessly transmit power to the coil 200. In one or more embodiments, the vehicle power system 170 can include a control circuit 205 that controls a switch 206. In one or more embodiments the control circuit 205 is connected to the coil 200 to detect when the coil 200 is receiving power from the external coil 290. The control circuit 205 can set the switch 206 to a first position corresponding to a first operational mode (e.g., receiver) when the control circuit 205 detects power from the external power source 280.

In the second operational mode the LV battery 250 can supply power through the three-port converter 245, compensation circuit 210, switch 206 to the coil 200 to wirelessly transmit power to multi-standard load receivers 260, effectuating the transmission of AC power to the different loads (271, 272, 273).

Figure 4:
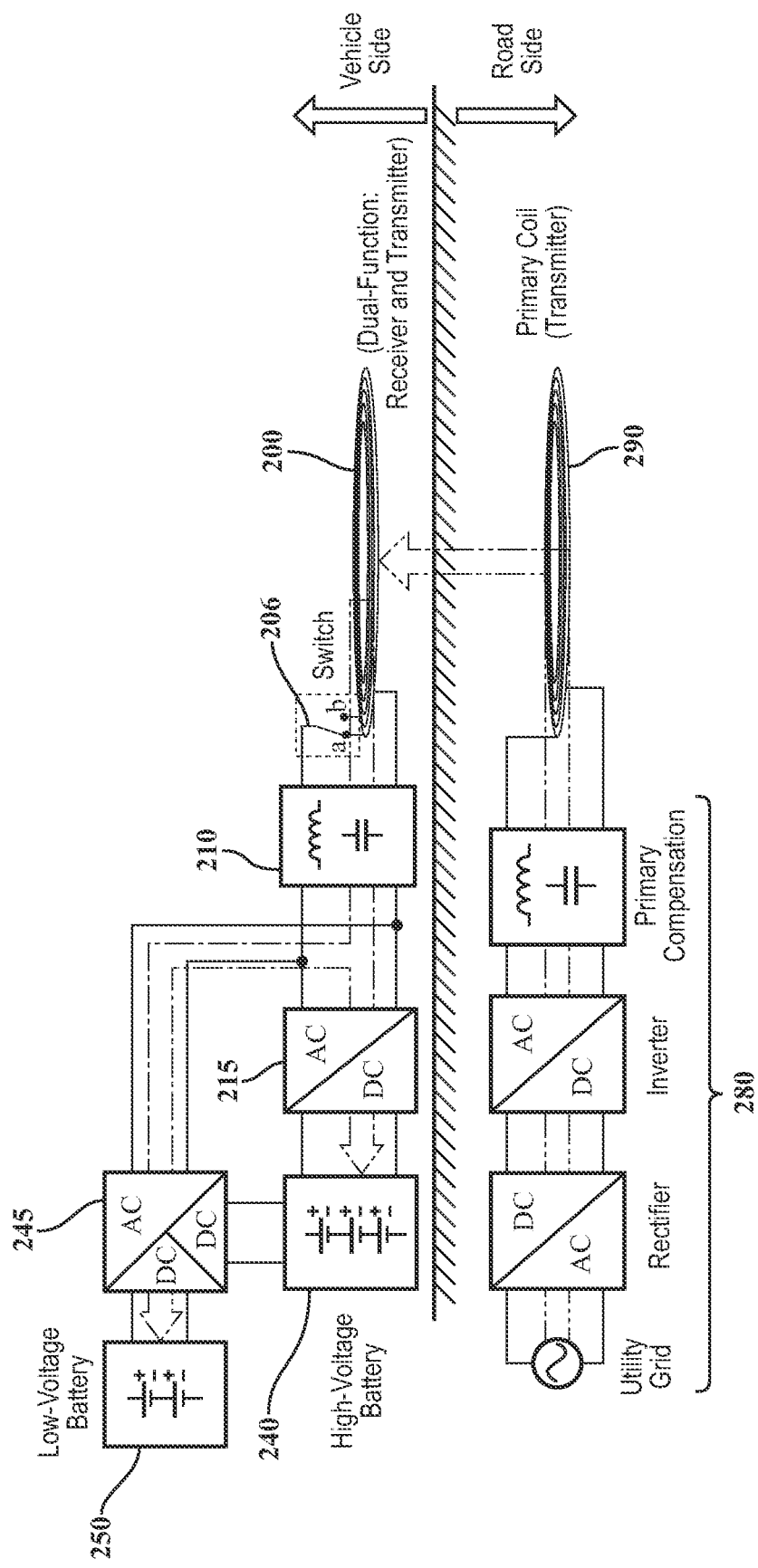
FIG. 4 illustrates an example first operational mode of the disclosed vehicle power system, according to the disclosed subject matter.
Figure 5:
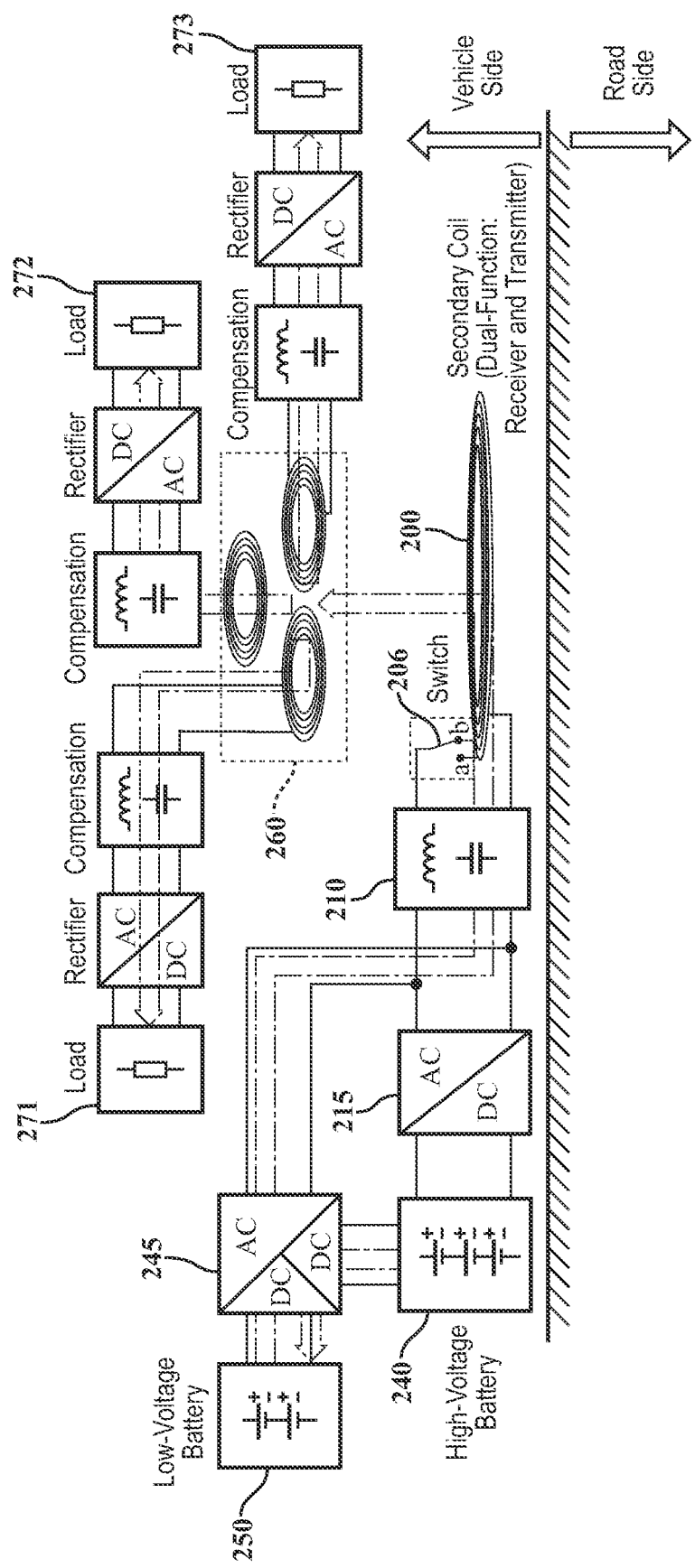
FIG. 5 illustrates an example second operational mode of the disclosed vehicle power system, according to the disclosed subject matter.

FIGS. 4 and 5 show the power flow diagrams under two different operational modes. FIG. 4 shows the first operational mode. In the first operational mode, power received from the external power source 280 passes through the compensation circuit 210, AC/DC converter 215, three-port converter 245 to charge the HV battery 240 and LV battery 250. FIG. 5 shows the second operational mode. In the second operational mode, the HV battery 240, which has a higher voltage than the LV battery 250, charges the LV battery 250 through the three-port converter 245. The LV battery 250 transfers power to the coil 200 through the switch 206. The coil 200 in turn transfers power wirelessly to the receivers 260 for loads 271, 272, 273.

In one or more embodiments the coil 200 is implemented as a flexible pad with a regulated inductance to match the different power requirements under the two operational modes.

In one or more embodiments, in the first operational mode the switch 206 connects to a first point 'a' on the coil 200. In the second operational mode, the switch 206 connects to a second point 'b' on coil 200. In one or more embodiments, the first operation mode position (point 'a') utilizes a larger portion of the coil 200 (e.g., more windings) than the second operation mode position (point 'b').

Figure 6:
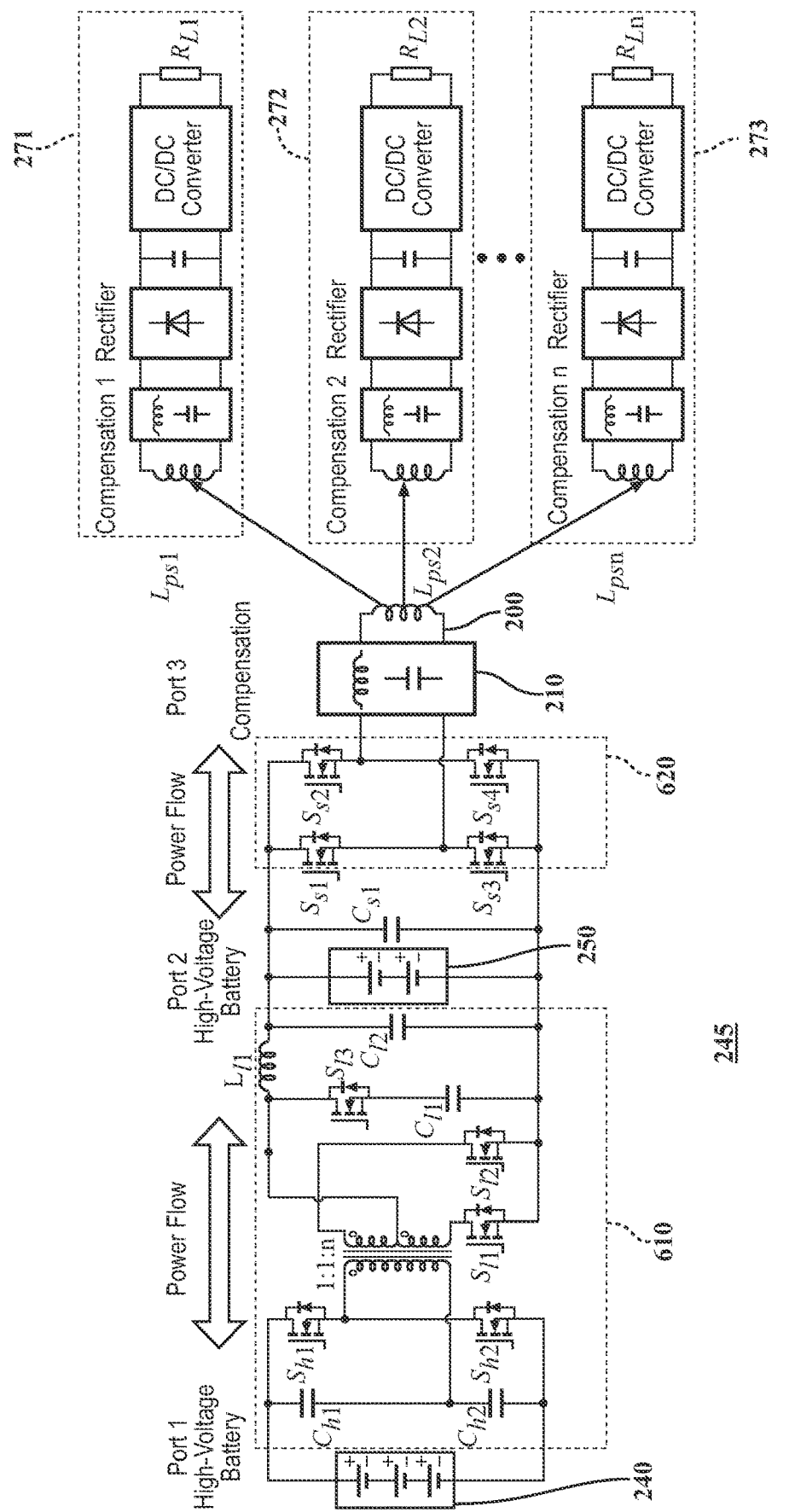
FIG. 6 illustrates an example embodiment of a three-port converter, according to the disclosed subject matter.

FIG. 6 shows the topology of an embodiment of the three-port converter 245. An isolated half-bridge push-pull converter 610 includes capacitors $C_{h1}$, $C_{h2}$, $C_{l1}$ and $C_{l2}$, switches $S_{h1}$, $S_{h2}$, $S_{l1}$, $S_{l2}$, and $S_{l3}$, and inductor $L_{l1}$ with a clamping circuit is connected between the HV battery 240 and LV battery 250. The clamping circuit includes power switch $S_{l3}$ and clamp-capacitor $C_{l1}$ and is used to suppress the voltage spikes across switches $S_{l1}$ and $S_{l2}$, as well as assist in the realization of soft-switching for $S_{l1}$, $S_{l2}$ and $S_{l3}$. In one or more embodiments a full-bridge circuit 620 is connected between the LV battery 250 and compensation circuit 210. The full-bridge circuit 620 functions as a rectifier when the coil 200 is in the first operational mode and functions as an inverter when the coil is in the second operational mode.

In the second operational mode the coil wirelessly transmits power through induction $L_{ps1}$, $L_{ps2}$, $L_{psn}$ to multiple loads 271, 271, 273. Each load can include a compensation circuit, rectifier and DC/DC converter. In one or more implementations the loads 271, 272, 273 can be, for example, a camera, LIDAR, GPS, sensor or other type of load that requires electrical power.

Figure 7:
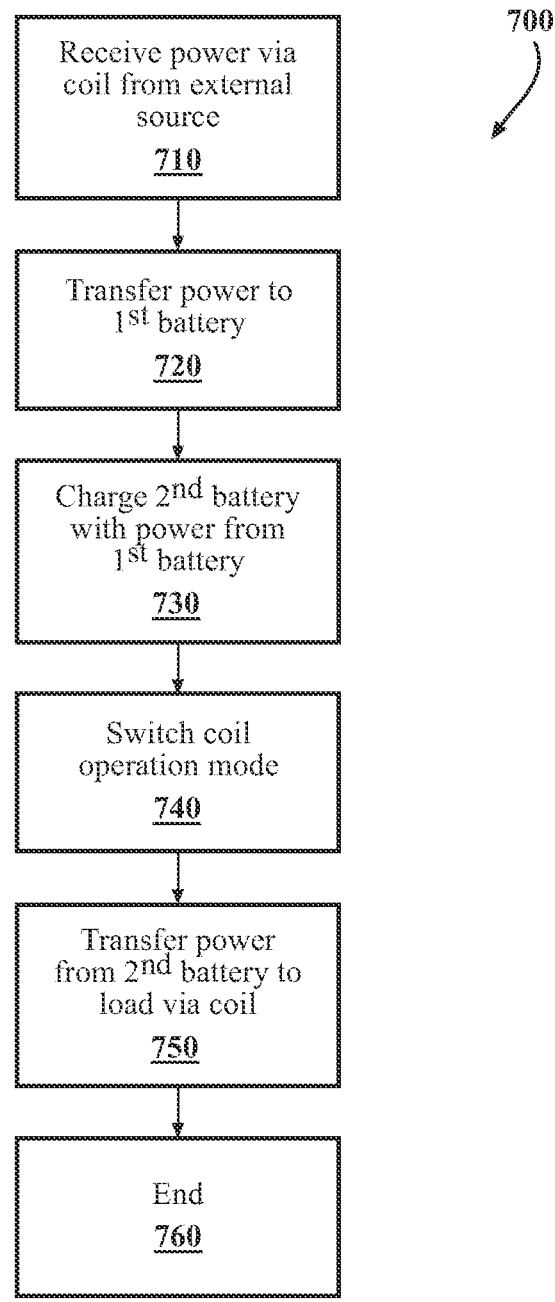
FIG. 7 illustrates a flowchart of a method of controlling a power system, according to the disclosed subject matter.

Additional and optional features of the vehicle power system 170 will now be discussed. FIG. 7 illustrates a flowchart of a method 700 of controlling a vehicle power system 170 according to the disclosed embodiments. Method 700 will be discussed from the perspective of the vehicle power system 170 of FIGS. 1-6. While method 700 is discussed in combination with the vehicle power system 170, it should be appreciated that the method 700 is also not limited to being implemented within the vehicle power system 170 but is instead one example of a system that may implement the method 700.

At operation 710, the vehicle power system 170 receives power from an external power source 280. The power is received wirelessly by a coil 200 functioning as a receiver in a first operational mode. In one or more embodiments, the vehicle power system 170 includes a control circuit 205, connected to the coil 200, that can sense whether the coil 200 is receiving power. The control circuit 205 can control the switch 206 to place the coil 200 in the first operational mode when the control circuit 205 senses the coil 200 receiving power. In one or more embodiments, placing the coil 200 in the first operational mode includes moving the switch 206 to a contact point on the coil 200 that utilizes a larger portion of the coil 200 than is used in a second operational mode. For example, the first operational mode can use more windings of the coil than the second operational mode uses.

At operation 720, the vehicle power system 170 transfers power received from the external power source 280 to a first battery, e.g., HV battery 240. In one or more embodiments the vehicle power system 170 transfers power received from the external power source 280 to both HV battery 240 and LV battery 250 simultaneously, e.g., through AC/DC converter 215 and three-port converter 245. In one or more embodiments, the vehicle power system 170 converts power transferred from the coil 200 to the HV battery 240 and/or LV battery 250 from AC to DC power.

At operation 730, the vehicle power system 170 charges the second battery, e.g., LV battery 250, with power from the first battery, e.g., HV battery 240. In one or more embodiments, the vehicle power system 170 transfers power from the HV battery 240 to the LV battery 250 via the three-port converter 245. In one or more embodiments, the first battery, e.g., HV battery 240, supplies a higher voltage than the second battery, e.g., LV battery 250. In one or more embodiments, the first battery, e.g., HV battery 240, supplies power to drive a motor of the vehicle 100 and the second battery, e.g., LV battery 250, supplies power at a lower voltage output level to drive one or more electronic components of the vehicle 100.

At operation 740, the vehicle power system 170 changes the operational mode of the coil 200 from the first operational mode to the second operational mode. In one or more embodiments the control circuit 205 senses that the coil 200 is not receiving power from the external source 280 and, in response, controls the switch 206 to place the coil 200 in the second operational mode. In one or more embodiments, placing the coil 200 in the second operational mode includes moving the switch 206 to a contact point on the coil 200 that utilizes a smaller portion of the coil 200 than is used in the first operational mode. For example, the second operational mode can use fewer windings of the coil 200 than the first operational mode uses.

At operation 750, the vehicle power system 170 transfers power from the second battery, e.g., LV battery 250, to an electrical load in the vehicle 100. The electrical load can be, for example, a camera, LIDAR, sensor, or other electronic component of the vehicle 100. The power is transferred wirelessly via the coil 200, functioning as a transmitter in the second operational mode. The process ends at 760.

Embodiments disclosed herein can be implemented in any type of vehicle that can include electronic components, including passenger vehicles, autonomous vehicles, drones, and other types of vehicles. When implemented in passenger vehicles, for safety concerns it is preferable that the vehicle design does not dispose metal in between the coil 200 and the receiver coils of the electronic component(s) while power is transferring.

Furthermore, although the figures generally show the coil 200 disposed in a floor position of the vehicle 100, the location of the coil 200 can be flexible. For example, in one or more implementations the coil 200 can be mounted vertically on the back of the vehicle 100 or other location of the vehicle 100, for example, to protect passengers from magnetic side effect on human body. In any case, the disclosed embodiments can improve vehicle design by providing a dual-function coil and eliminating or reducing the need for wires and cables to deliver power to various electronic components in a vehicle.

FIG. 1, which shows various components of the vehicle 100, will now be discussed in full detail as an example environment within which the system and methods disclosed herein may operate.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

In some instances, the vehicle 100 is configured to switch selectively between an autonomous mode, one or more semi-autonomous operational modes, and/or a manual mode. Such switching can be implemented in a suitable manner, now known or later developed. "Manual mode" means that all or a majority of the navigation and/or maneuvering of the vehicle is performed according to inputs received from a user (e.g., human driver). In one or more arrangements, the vehicle 100 can be a conventional vehicle that is configured to operate in only a manual mode.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can implement the database 119 and can further include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

As noted above, the vehicle 100 can include the sensor system 120. The sensor system 120 can include one or more sensors, for example, that can be powered by the disclosed vehicle power system 170. "Sensor," as used herein, means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself, such as one or more actual states of the vehicle 100 as discussed above. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126, e.g., one or more monocular cameras. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). In one or more embodiments, the input system 130 can be powered by the disclosed vehicle power system 170.

The vehicle 100 can include an output system 135. An "output system" includes any device, component, or arrangement or groups thereof that enable information/data to be presented to a vehicle passenger (e.g., a person, a vehicle passenger, etc.). The output system 135 can function as part of an interface that can present, for example, forecast notifications as described above. In one or more embodiments, the output system 135 can be powered by the disclosed vehicle power system 170.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed. One or more of these systems can by operably connected to wheels of the vehicle in a manner that allows individual application of control or commands implemented by the respective system.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system. In one or more embodiments, the navigation system 147 can be powered by the disclosed vehicle power system 170.

The processor(s) 110, the vehicle power system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110 and/or the autonomous driving module(s) 160 may control some or all of these vehicle systems 140 and, thus, may be partially or fully autonomous.

The processor(s) 110 and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) 110 and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 can be configured to determine travel path(s) and determine current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A vehicle power system for a vehicle, comprising:
   a coil that, in a first operational mode, receives power wirelessly from an external source;
   a first battery connected to the coil to receive power transferred from the coil while the coil is in the first operational mode;
   a second battery that receives power from the first battery; and
   a switch that switches the coil between the first operational mode and a second operational mode in which the coil receives power from the second battery and wirelessly transfers power from the second battery to an electrical load in the vehicle.

2. The vehicle power system of claim 1, further comprising a control circuit to sense power received by the coil and also connected to the switch to actuate the switch, wherein the control circuit sets the switch to a first operational mode position when the control circuit senses the coil receiving power from the external source and sets the switch to a second operational mode position when the control circuit does not sense the coil receiving power from the external source.

3. The vehicle power system of claim 2, wherein the first operational mode position utilizes a larger portion of the coil than the second operational mode position.

4. The vehicle power system of claim 1, wherein the first battery has a higher voltage output than the second battery.

5. The vehicle power system of claim 1, further comprising an AC/DC converter to convert power transferred from the coil to the first battery.

6. The vehicle power system of claim 1, further comprising a three-port converter that is connected between the first battery, the second battery and the coil,
wherein the three-port converter converts power transferred from the coil to the first battery from AC to DC power, converts power transferred from the first battery to the second battery from a higher voltage to a lower voltage, and converts power transferred from the second battery to the coil from DC to AC power.

7. The vehicle power system of claim 6, wherein the three-port converter includes an isolated half-bridge push-pull converter with a clamping circuit connected between the first battery and the second battery, and a full-bridge topology between the second battery and the coil.

8. The vehicle power system of claim 1, the first battery and the second battery are both charged by the coil when the coil is in the first operational mode.

9. The vehicle power system of claim 1, wherein the electrical load is one or more of a sensor, a camera, a GPS device, or a mobile computing device.

10. The vehicle power system of claim 1, wherein the coil is vertically disposed in a rear section of the vehicle.

11. The vehicle power system of claim 1, wherein the coil and a receiver of the electrical load are aligned in a position along an axis that does not pass through a passenger seating space inside the vehicle.

12. A method of controlling a power system for a vehicle, comprising:
receiving power, by a coil in a first operational mode, wirelessly from an external source;
transferring power from the coil to a first battery while the coil is in the first operational mode;
charging a second battery with power from the first battery; and
switching the coil from the first operational mode to a second operational mode in which the coil receives power from the second battery and wirelessly transfers power from the second battery to an electrical load in the vehicle.

13. The method of claim 12, further comprising:
sensing whether the coil is receiving power;
switching the coil from the first operational mode to the second operational mode when the coil is receiving power from the external source; and
switching the coil to the second operational mode when the coil is not receiving power from the external source.

14. The method of claim 12, wherein a larger portion of the coil is utilized in the first operational mode than in the second operational mode.

15. The method of claim 12, wherein a higher voltage is output from the first battery than from the second battery.

16. The method of claim 12, further comprising converting power transferred from the coil to the first battery from AC to DC power.

17. The method of claim 12, further comprising:
converting power transferred from the coil to the first battery from AC to DC power;
converting power transferred from the first battery to the second battery from a higher voltage to a lower voltage; and
converting power transferred from the second battery to the coil from DC to AC power.

18. The method of claim 12, wherein both the first battery and the second battery are charged by the coil when the coil is in the first operational mode.

19. The method of claim 12, wherein the coil is disposed vertically in a rear section of the vehicle.

20. The method of claim 12, wherein the coil and a receiver of the electrical load are aligned along an axis that does not pass through a passenger seating space inside the vehicle.

* * * * *